*(12)* United States Patent
Gürtler et al.

*(10)* Patent No.: US 9,062,156 B2
*(45)* Date of Patent: *Jun. 23, 2015

(54) PROCESS FOR THE PRODUCTION OF POLYETHER CARBONATE POLYOLS

(75) Inventors: Christoph Gürtler, Köln (DE); Stefan Grasser, Leverkusen (DE); Aurel Wolf, Wülfrath (DE)

(73) Assignee: Bayer Intellectual Property GmbH, Monheim (DE)

( * ) Notice: Subject to any disclaimer, the term of this patent is extended or adjusted under 35 U.S.C. 154(b) by 88 days.

This patent is subject to a terminal disclaimer.

(21) Appl. No.: 13/879,214

(22) PCT Filed: Oct. 11, 2011

(86) PCT No.: PCT/EP2011/067707
§ 371 (c)(1),
(2), (4) Date: Apr. 12, 2013

(87) PCT Pub. No.: WO2012/049162
PCT Pub. Date: Apr. 19, 2012

(65) Prior Publication Data
US 2013/0211042 A1 Aug. 15, 2013

(30) Foreign Application Priority Data
Oct. 14, 2010 (EP) .................... 10187625

(51) Int. Cl.
*C08G 64/32* (2006.01)
*C08G 64/34* (2006.01)
*C08G 65/26* (2006.01)
(Continued)

(52) U.S. Cl.
CPC .............. *C08G 64/323* (2013.01); *C08G 64/34* (2013.01); *C08G 65/2663* (2013.01); *C08G 65/2603* (2013.01); *C08G 65/2696* (2013.01); *C08G 64/205* (2013.01)

(58) Field of Classification Search
CPC ........................................................ C08G 64/32
USPC ...... 528/405, 408, 409, 415, 485, 502 C, 503
See application file for complete search history.

(56) References Cited

U.S. PATENT DOCUMENTS 3,404,109 A  10/1968  Milgrom
3,829,505 A  8/1974  Herold
(Continued)

FOREIGN PATENT DOCUMENTS

DE         203735 A1    11/1983
DE   102005041142 A1    3/2007
(Continued)

OTHER PUBLICATIONS

U.S. Appl. No. 13/821,254 claims.*
(Continued)

*Primary Examiner* — Duc Truong
(74) *Attorney, Agent, or Firm* — Drinker Biddle & Reath LLP

(57) ABSTRACT

The present invention relates to a process for the production of polyether carbonate polyols from one or more H-functional starter substances, one or more alkylene oxides (epoxides) and carbon dioxide in the presence of at least one double metal cyanide catalyst, wherein the production of the polyether carbonate polyols is carried out in a tubular reactor.

13 Claims, 2 Drawing Sheets

(51) Int. Cl.
*C08G 64/20* (2006.01)
*C08G 59/20* (2006.01)

(56) References Cited

U.S. PATENT DOCUMENTS

| | | | |
|---|---|---|---|
| 3,941,849 | A | 3/1976 | Herold |
| 4,500,704 | A | 2/1985 | Kruper, Jr. et al. |
| 5,158,922 | A | 10/1992 | Hinney et al. |
| 5,470,813 | A | 11/1995 | Le-Khac |
| 6,780,813 | B1 | 8/2004 | Hofmann et al. |
| 7,008,900 | B1 | 3/2006 | Hofmann et al. |
| 2003/0204042 | A1 | 10/2003 | Moethrath et al. |
| 2005/0027145 | A1 | 2/2005 | Hofmann et al. |
| 2006/0224010 | A1* | 10/2006 | Hinz et al. .................... 558/276 |
| 2008/0161509 | A1 | 7/2008 | Ostrowski et al. |
| 2009/0203874 | A1 | 8/2009 | Loffler et al. |
| 2010/0048935 | A1 | 2/2010 | Mijolovic et al. |

FOREIGN PATENT DOCUMENTS

| | | | |
|---|---|---|---|
| EP | 0700949 | A2 | 3/1996 |
| EP | 0743093 | A1 | 11/1996 |
| EP | 0761708 | A2 | 3/1997 |
| EP | 1359177 | A1 | 11/2003 |
| EP | 10163170.3 | | 5/2010 |
| JP | 4145123 | B2 | 9/2008 |
| WO | WO-97/40086 | A1 | 10/1997 |
| WO | WO-98/16310 | A1 | 4/1998 |
| WO | WO-00/47649 | A1 | 8/2000 |
| WO | WO-01/39883 | A1 | 6/2001 |
| WO | WO-01/80994 | A1 | 11/2001 |
| WO | WO-2006/103213 | A1 | 10/2006 |
| WO | WO-2007135154 | A1 | 11/2007 |
| WO | WO-2008092767 | A1 | 8/2008 |

OTHER PUBLICATIONS

U.S. Appl. No. 13/698,694 claims.*
U.S. Appl. No. 13/636,509 claims.*
U.S. Appl. No. 13/574,146 claims.*
International Search Report for PCT/EP2011/067707 mailed Dec. 19, 2011.

* cited by examiner

PROCESS FOR THE PRODUCTION OF POLYETHER CARBONATE POLYOLS

RELATED APPLICATIONS

This application is a national stage application (under 35 U.S.C. §371) of PCT/EP2011/067707, filed Oct. 11, 2011, which claims benefit of European application 10187625.8, filed Oct. 14, 2010, both of which are incorporated herein by reference in their entirety.

The present invention relates to a process for the production of polyether carbonate polyols from one or more H-functional starter substances, one or more alkylene oxides (epoxides) and carbon dioxide in the presence of at least one double metal cyanide catalyst, wherein the production of the polyether carbonate polyols is carried out in a tubular reactor.

The production of polyether carbonate polyols by catalytic addition of alkylene oxides (epoxides) and carbon dioxide to H-functional starter substances (starters) has been intensively studied for more than 40 years (Inoue et al, Copolymerization of Carbon Dioxide and Epoxide with Organometallic Compounds; Die Makromolekulare Chemie 130, 210-220, 1969). This reaction is shown diagrammatically in diagram (I), wherein R denotes an organic residue such as alkyl, alkylaryl or aryl, which can also contain heteroatoms such as e.g. O, S, Si etc. in each case, and wherein e and f denote an integer, and wherein the product shown here in diagram (I) for the polyether carbonate polyol is only to be understood such that blocks with the structure shown can in principle be found in the polyether carbonate polyol obtained, but the sequence, number and length of the blocks and the OH functionality of the starter can vary and are not limited to the polyether carbonate polyol shown in diagram (I). This reaction (see diagram (I)) is very advantageous from an environmental point of view, since this reaction represents the conversion of a greenhouse gas, such as carbon dioxide ($CO_2$), to a polymer. As an additional product, the cyclic carbonate shown in formula (I) is obtained (e.g. for $R=CH_3$ propylene carbonate).

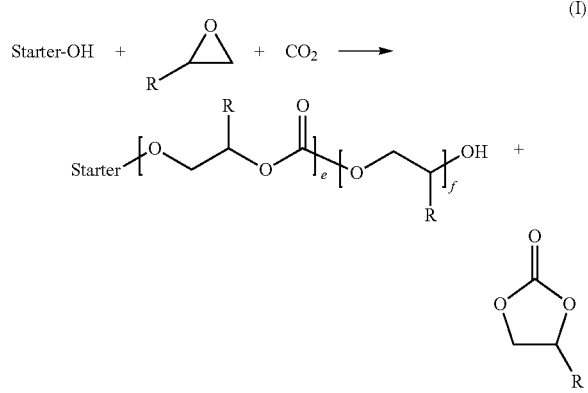

The formation of copolymers from epoxides (e.g. propylene oxide) and carbon dioxide has long been known. Thus, for example, U.S. Pat. No. 4,500,704 describes the copolymerisation of carbon dioxide and propylene oxide using DMC catalysts. The process is a batch process, i.e. catalyst and the full quantity of propylene oxide are charged before the beginning of the reaction and carbon dioxide is added before heating. By filling the autoclave with the full quantity of epoxide, however, there is the disadvantage that a large quantity of propylene oxide is charged which, in the event of homopolymerisation, can lead to the evolution of approx. 1400 kJ/kg polymer. Such large amounts of heat can be controlled only with difficulty in a stirred tank and thus entail disadvantages on the grounds of operating safety.

A batch method within the meaning of this invention is understood to mean that all of the feedstocks, i.e. epoxide(s), optionally H-functional starter substance(s) and carbon dioxide, are introduced into the reactor before the beginning of the reaction. In the context of this invention, a semi-batch method is understood to mean that at least one of the above-mentioned substances is fed into the reactor over a certain period of time.

WO-A 2006/103213 describes a semi-batch type process by way of example, where the H-functional starter substance and the catalyst are initially charged and dried there. After activation of the catalyst by adding a partial quantity of the propylene oxide, more propylene oxide is continuously metered into the reactor and the desired $CO_2$ pressure is established. The continuous addition of propylene oxide takes account of an improved safety concept, inter alia. However, one disadvantage of this method in conjunction with an autoclave or stirred tank is that, depending on the reactor volume, the fill level of the reactor, the properties of the liquid phase, the composition of the gaseous phase and other parameters, at a preset pressure and a preset temperature a variable quantity of carbon dioxide is formed in the reactor. This means that, during the reaction, the available quantity of carbon dioxide at constant pressure and constant temperature differs as a function of the above-mentioned parameters. These parameters generally have an effect on the product properties. In addition, it may be expected that with this process concept, according to the disclosure of WO-A 2008/092767, DMC catalysts have very poor reaction characteristics or show no reaction at all with low molecular weight H-functional starter substances (such as e.g. water, propylene glycol or glycerol). Since low molecular weight starter substances have an inhibiting effect, these cannot be used or can be used only with difficulty, particularly in batch or semi-batch processes in which the full quantity of the H-functional starter substance(s) is initially charged.

WO-A 2008/092767 discloses a process for the production of polyether carbonate polyols by addition of alkylene oxides and carbon dioxide to H-functional starter substances using DMC catalysts, wherein one or more higher molecular weight starter substances (e.g. polypropylene oxide with a molecular weight of 460 g/mol) are initially charged in the reactor and one or more low molecular weight starter substances (e.g. monopropylene glycol; molecular weight 76 g/mol; see example 1) and alkylene oxide are metered into the reactor continuously during the reaction. According to WO-A 2008/092767, the quantity of carbon dioxide incorporated into the polymer is dependent on the $CO_2$ pressure in the reactor, a higher $CO_2$ pressure resulting in a higher incorporation of carbon dioxide into the polymer. This has the disadvantages that in procurement, expensive high pressure equipment is necessary for large-scale industrial production of polyether carbonate polyols and at the same time, because of the relatively large volume of gas, a complex safety concept has to be prepared.

Another disadvantage of the batch-type process or semi-batch-type process disclosed in the prior art is the fact that the catalyst must first be activated (see e.g. WO-A 2008/092767; example 1), which is disadvantageously associated with an additional step and thus creates additional costs.

A further disadvantage of a stirred tank is the unfavourably low ratio of surface to volume, which leads to the fact that the heat liberated by the polymerisation (>1000 kJ/kg polymer)

cannot be dissipated very efficiently over the surface of the reactor, which may have a disadvantageous effect on temperature control of the reaction. If heat dissipation is carried out by an internal or external heat exchanger, this has the disadvantage that the purchase of a heat exchanger leads to a higher investment sum for the plant and thus to higher costs. If adequate heat dissipation, and thus an optimum temperature of the reaction mixture, is not established, this can lead to unfavourable selectivity of the reaction or loss of catalyst activity. Furthermore, the product can be degraded and the catalyst irreversibly deactivated by too high a temperature. If the heat dissipation of a stirred tank reactor is inadequate, the possible high rate of reaction of the highly active DMC catalysts cannot be fully exploited, i.e. a limitation of the maximum rates of reaction takes place owing to the limited heat dissipation performance of these types of reactor, and even reactors having either internal or external heat exchangers are generally limited in this respect. The result is that the reaction can only be conducted up to a certain alkylene oxide metering rate at constant temperature, although based on the high activity of the DMC catalyst, a higher alkylene oxide metering rate would be achievable. Another basic disadvantage of a semi-batch or batch process lies in the fact that the process has to be stopped in order to remove the product, therefore resulting in a loss of time.

A continuous reaction of alkylene oxides and $CO_2$ can take place in a back-mix reactor (continuous stirred tank) or in a continuous reactor without back mixing. Continuous reactors with back mixing are generally distinguished by the same disadvantages as stirred tanks with batch or semi-batch operation.

WO-A 2007/135154 discloses a reaction unit with several layers A, B, arranged parallel one on top of the other, which are microstructured so that each layer has a plurality of channels arranged parallel to one another, which form a continuous flow path from one side of the plate to the opposite side thereof. It can be used to produce polyether polyols from one or more alkylene oxides and optionally carbon dioxide and one or more H-functional starter compounds. To make world-scale production possible, so-called "numbering-up" must be carried out, which leads to uneconomic production because of the expense in terms of control engineering. However, when a suspended heterogeneous catalyst, e.g. a DMC catalyst according to the process of the present invention, is used, problems may be expected in relation to the deposition of catalyst in the microreactor and the parallel plates, which would lead to blockages in a continuously operated process.

It was therefore the object of the present invention to provide a process for the production of polyether carbonate polyols which does not have the above-mentioned disadvantages and wherein the temperature of the reaction can be controlled well by simple means.

Surprisingly, it has now been found that a process for the production of polyether carbonate polyols by addition of one or more alkylene oxides and carbon dioxide to one or more H-functional starter substances in the presence of at least one DMC catalyst, characterised in that the addition is performed in a tubular reactor, achieves the above object.

The tubular reactor within the meaning of the invention generally has a ratio of tube length L to tube diameter $d_R$ of $L/d_R > 50$ and is preferably free from a plurality of layers arranged parallel one on top of the other, which are optionally microstructured so that each layer has a plurality of channels arranged parallel to one another, which form a continuous flow path from one side of the plate to the opposite side thereof.

Performing the addition of one or more alkylene oxides and carbon dioxide to one or more H-functional starter substances in the presence of at least one DMC catalyst in a tubular reactor has the advantage that efficient heat dissipation takes place. No problems were observed relating to the deposition of DMC catalyst in the tubular reactor according to the process of the invention. By means of good control of the reaction temperature, it is thus also possible to avoid degradation of polyether carbonate polyol that has already formed and/or deactivation of DMC catalyst (possibly irreversibly) by too high a temperature.

In addition, it has surprisingly been found that in the process according to the invention, DMC catalysts can be used without prior activation steps (in the presence or absence of carbon dioxide). This has the advantage that, compared with a batch or semi-batch process in stirred tanks, no prior time- and cost-intensive activation step of the DMC catalyst is necessary. In principle, however, it is also possible firstly to activate the DMC catalyst in an upstream step and then to use it in the process according to the invention. The upstream step for the activation of the DMC catalyst can take place in a first section of the tubular reactor or in an upstream reactor which itself can in turn be a tubular reactor or a stirred tank.

Activation of the DMC catalyst refers to a step in which a partial quantity of the alkylene oxide is added to the DMC catalyst, optionally in the presence of $CO_2$, and then the addition of the alkylene oxide compound is interrupted, a temperature peak ("hotspot") and/or pressure drop being observed in the reactor owing to a subsequent exothermic chemical reaction. The activation process step is the period of time from the addition of the partial quantity of alkylene oxide compound, optionally in the presence of $CO_2$, to the DMC catalyst up to the formation of the hotspot. In general, the activation step can be preceded by a step for drying the DMC catalyst and optionally the starter by elevated temperature and/or reduced pressure, this drying step not being part of the activation step within the meaning of the present invention.

A preferred embodiment involves a process for the production of polyether carbonate polyols by addition of one or more alkylene oxides and carbon dioxide to one or more H-functional starter substances in the presence of at least one DMC catalyst, characterised in that the addition is performed in a tubular reactor, wherein
(i) the DMC catalyst is suspended in one or more H-functional starter substances,
(ii) the suspension from (i) is brought into contact with one or more alkylene oxides and with 10 to 200 bar, preferably 15 to 180 bar, particularly preferably 20 to 120 bar carbon dioxide, and
(iii) the mixture resulting from (ii) is reacted in a tubular reactor at a temperature of 80 to 150° C., preferably 90 to 135° C. and for preference at a reaction pressure of 10 to 200 bar, particularly preferably 15 to 180 bar, most particularly preferably 20 to 120 bar.

Reaction pressure is understood as the pressure in the tubular reactor (step iii). This pressure can be controlled e.g. by introducing more carbon dioxide into the tubular reactor to increase the pressure or reducing the pressure by means of a valve on the tubular reactor.

In step (ii) the individual components can be brought into contact simultaneously or consecutively, before the addition to the tubular reactor or in the tubular reactor; a "consecutive bringing into contact" of the individual components is understood to mean that
(ii-1) the suspension from (i) is firstly brought into contact in a first mixer with one or more alkylene oxides and then brought into contact in a second mixer with 10 to 200 bar, preferably 15 to 180 bar, particularly preferably 20 to 120 bar carbon dioxide, or (ii-2) the suspension from (i) is firstly brought into contact in a first mixer with 10 to 200 bar, preferably 15 to 180 bar, particularly preferably 20 to 120 bar carbon dioxide and is then brought into contact in a second mixer with one or more alkylene oxides.

Step (ii) can be carried out at a temperature of 5 to 50° C. The result of this is that, owing to the relatively low temperature, no polymerisation occurs in the mixer.

Figure 1:
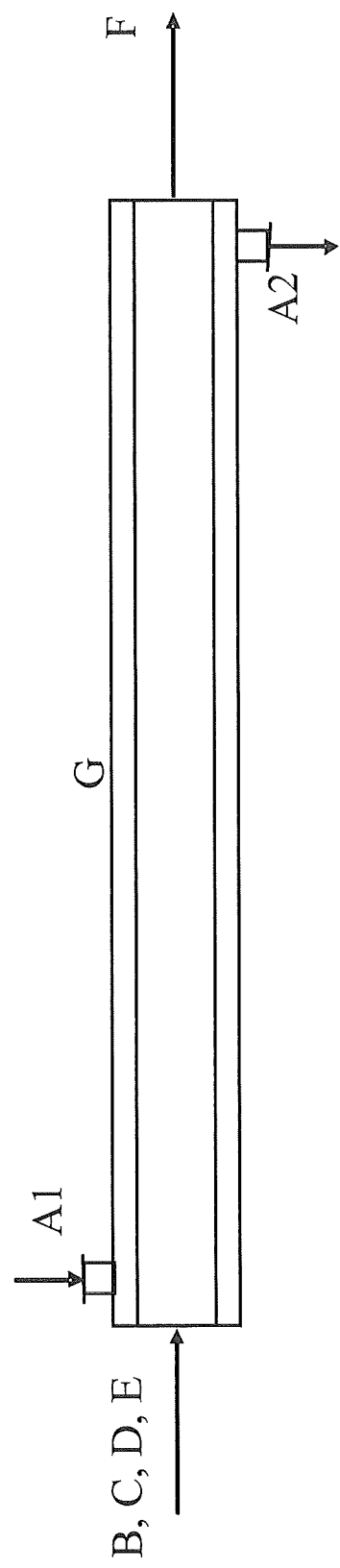
FIG. 1 shows a schematic of the tubular reactor provided with a cooling jacket.

The tubular reactor is e.g. a heated tube. One possible embodiment is shown diagrammatically in FIG. 1. Here, the tubular reactor is provided with a cooling jacket, wherein a heat transfer fluid is fed via an inlet (A1) or outlet (A2) for temperature control purposes. The feedstocks, i.e. the mixture of DMC catalyst (E), one or more H-functional starter substances (D), one or more alkylene oxides (B) and carbon dioxide (C) resulting from step (ii), are continuously fed to tubular reactor (G) at one end (inlet) and the resulting product (F) (substantially polyether carbonate polyol) is continuously removed at the other end of the tubular reactor (outlet).

The feed lines to the mixers or tubular reactor can preferably be heated, and so it is also possible to use solid or highly viscous H-functional starter substances.

The tubular reactor is preferably made of stainless steel, but it also possible for other materials to be used provided that the material is compatible in terms of feedstocks/products, pressures etc.

The tubular reactor can be constructed either from a continuous piece of tube or from at least two tubes that are joined together, e.g. having different properties such as different internal diameters. The internal diameter of the tubular reactor can be the same over the entire length or can vary. The internal diameter of the tubular reactor is preferably from 1.1 mm to 500 mm. For example, a first section of the tubular reactor is thinner than the second section. This has the advantage that at the beginning of the tubular reactor the heat of reaction as a result of the more favourable area/volume ratio a better heat exchange is achieved. Preferably, over the first 20 to 60% of its length the tubular reactor has an internal diameter of the tubular reactor of 1.1 mm to <100 mm, and over the second 80 to 40% of its length it has an internal diameter of the tubular reactor of 100 mm to 500 mm, preferably of 100 mm to 250 mm.

Preferably according to the process of the invention, average residence times of 0.5 minutes to 6 hours, preferably of 1 minute to 4 hours, particularly preferably 1 minute to 60 minutes, are established in the tubular reactor. The average residence time can be determined from the ratio between volume flow and reactor volume, the latter being obtained from the internal diameter of the tube or tubes and the length of the tube or the length of the individual tube sections. If the residence times are too short, the conversion is generally incomplete, and too long a residence time is generally disadvantageous in terms of the space-time yield and thus makes the process less economically viable.

It is advantageous to adjust the volume flow so that a turbulent flow profile is obtained (dimensionless Reynolds number greater than 2300).

If the reactor consists of at least two tubes joined together, it is possible to set these to different temperatures (e.g. by heating or cooling).

In principle, it is also possible to have several addition points along the tubular reactor, so that alkylene oxide or a mixture of several alkylene oxides and H-functional starter substances or a mixture of H-functional starter substances can be added at various points of the reactor. This makes it possible to produce block copolymers.

A tubular reactor with an internal diameter of 1.1 mm to 250 mm can preferably be operated without inserts. A tubular reactor with an internal diameter of >250 mm to 500 mm can preferably contain one or more static mixers or a combination of static mixers and heat exchanger (e.g. cooling coils).

It is advantageous if the entire volume of the tubular reactor is filled with liquid/suspension. Ideally this liquid or suspension is single-phase with respect to the liquid in order to guarantee particularly good mass transfer. This is generally achieved by the temperature and pressure given in step (iii).

In the process, preferably dried and ground DMC catalyst (e.g. vacuum drying oven at 100° C. and 900 mbar), H-functional starter substances and alkylene oxide(s) and carbon dioxide are pumped continuously through one or more tubes, with carbon dioxide being present in liquid form to enable better miscibility of the components. The molar ratios of the reactants vary according to the desired polymer.

The dried DMC catalyst is preferably added as a suspension in one or more H-functional starter substances. Typical concentrations of the DMC catalyst in the catalyst suspension are from 0.1-50 wt. %, preferably 0.1-25 wt. % and particularly preferably 0.1-10 wt. %, based on the catalyst suspension comprising DMC catalyst and H-functional starter substances. The suspension should in any case be such that it remains capable of being transported by conventional pumps (e.g. diaphragm pumps).

It is advantageous to grind the DMC catalyst to a particular particle size before use. Particles smaller than 100 μm have proved practicable. In principle, even smaller particle sizes are even better in order to avoid blockages.

Figure 2:
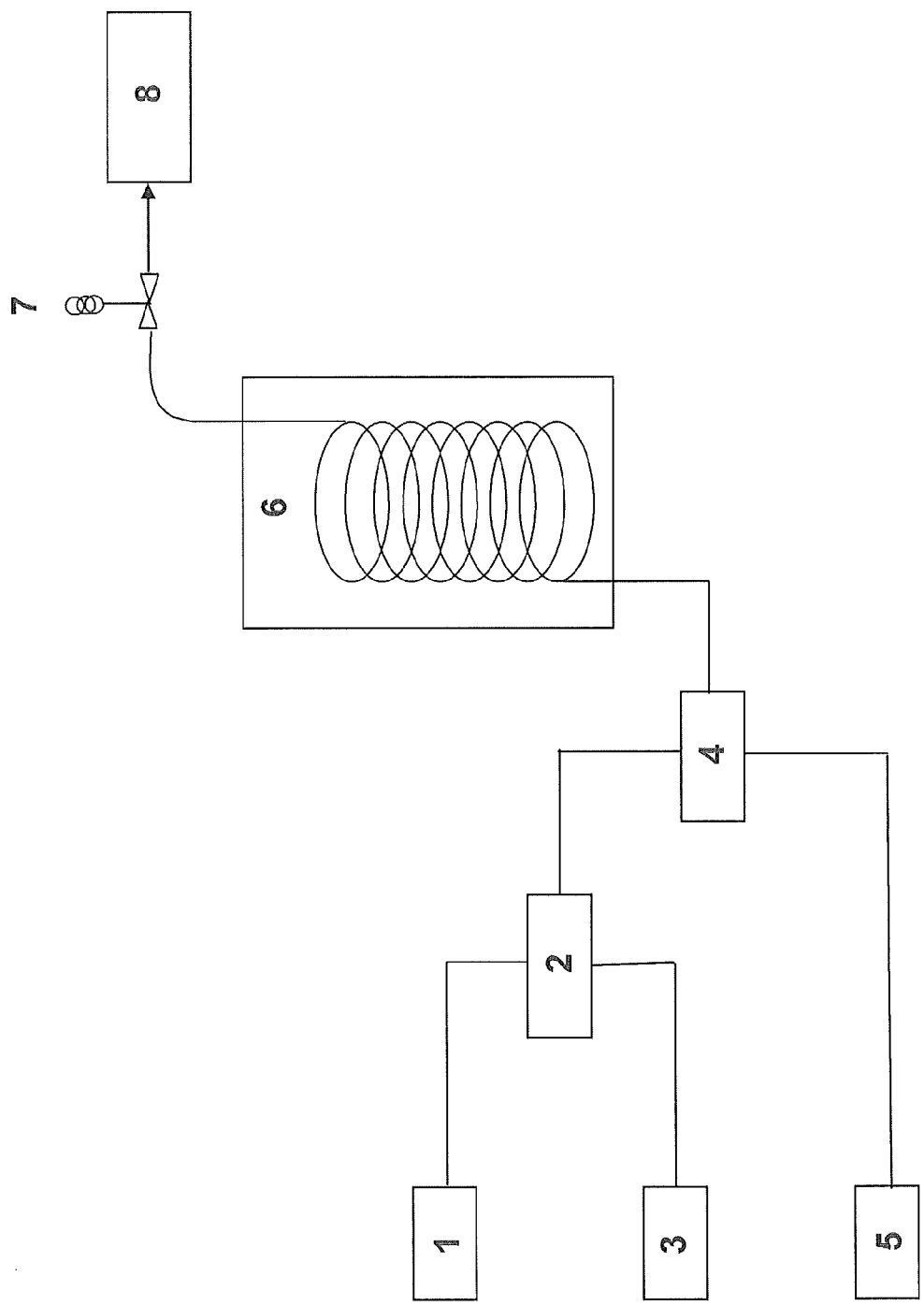
FIG. 2 shows a schematic of the process.

A schematic test setup for a preferred embodiment is shown in FIG. 2. From the agitated feed tank 1 the suspension consisting of one or more H-functional starter substances and ground and dried DMC catalyst is pumped using a pump (e.g. a diaphragm pump) to a mixer 2 (e.g. a cascade mixer). The alkylene oxide (e.g. propylene oxide) from feed tank 3 is transported by means of a pump (e.g. an HPLC pump) to the mixer 2. In mixer 2, mixing takes place at a temperature of 5 to 50° C., preferably 10 to 45° C., the resulting mixture not yet reacting. This mixed stream is fed into the mixer 4 (e.g. a cascade mixer), where it is mixed at a temperature of 5 to 50° C., preferably 10 to 45° C., with carbon dioxide. Here again, no reaction yet takes place. The carbon dioxide is transported from a supply vessel 5 (e.g. a gas cylinder with dip tube) by means of a pump (e.g. an HPLC pump). The reaction mixture is fed from 4 into tubular reactor 6. The tubular reactor is brought to a temperature of 80 to 150° C., preferably 90 to 135° C. (preferably by a heat exchanger or thermostatically controllable oil bath), and preferably adjusted to a reaction pressure of 10 to 200 bar, particularly preferably 15 to 180 bar, most particularly preferably 20 to 120 bar, at which the actual reaction (i.e. the addition of one or more alkylene oxides and carbon dioxide to one or more H-functional starter substances in the presence of at least one DMC catalyst) takes place. The to maintain the constant pressure needed for the supercritical carbon dioxide is adjusted by means of the pressure retention valve 7. The resulting product (polyether carbonate polyol) is collected in the tank 8.

In principle, different mixers are conceivable at positions 2 and 4. For example, the mixers mentioned in WO-A 2007/135154 are suitable, in particular split-recombine mixers such as e.g. the "Cascade Mixer 2S" from Ehrfeld Mikrotechnik BTS GmbH used in the exemplary embodiment. These split-recombine mixers are distinguished by stages of repeated splitting and recombining of flows. In each of these stages, the number of layers is successively doubled and thus the thickness of the layers and the diffusion path are halved. The mixing can also take place in the tube by means of nozzles or mixers with moving, rotating inserts.

As a result of the stated reaction temperature in the tubular reactor, on the one hand a sufficiently high rate of reaction and a high conversion rate are achieved, which contributes to reducing the residence times in the reactor and obtaining the products free from feedstocks (complete conversion) and, on the other hand, potentially problematic side reactions, particularly a degradation of the product (substantially polyether carbonate polyol) occurring at too high a temperature or a deterioration in selectivity (i.e. increasing proportion of cyclic carbonate such as e.g. propylene carbonate in the product), are avoided.

If the tubular reactor is operated at the stated reaction pressure, this has the advantage that the feedstocks are present in liquid form in even at elevated temperature. In addition, a high pressure causes a higher rate of reaction and a higher conversion as well as improving the intermixing of the reactants.

The polyether carbonate polyols obtained according to the invention can generally have a functionality of at least 1, preferably of 2 to 8, particularly preferably of 2 to 6 and most particularly preferably of 2 to 4. The molecular weight is preferably 400 to 10000 g/mol and particularly preferably 500 to 6000 g/mol.

In general, alkylene oxides (epoxides) with 2-24 carbon atoms can be used for the process according to the invention. The alkylene oxides with 2-24 carbon atoms are e.g. one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexene oxide, cycloheptene oxide, cyclooctene oxide, styrene oxide, methylstyrene oxide, pinene oxide, mono- or polyepoxidised fats as mono-, di- and triglycerides, epoxidised fatty acids, $C_1$-$C_{24}$ esters of epoxidised fatty acids, epichlorohydrin, glycidol and derivatives of the glycidols, such as e.g. methyl glycidyl ether, ethyl glycidyl ether, 2-ethylhexyl glycidyl ether, allyl glycidyl ether, glycidyl methacrylate and epoxide functional alkyloxysilanes, such as e.g. 3-glycidyloxypropyltrimethoxysilane, 3-glycidyloxypropyltriethoxysilane, 3-glycidyloxypropyltripropoxysilane, 3-glycidyloxypropylmethyldimethoxysilane, 3-glycidyloxypropylethyldiethoxysilane, 3-glycidyloxypropyltriisopropoxysilane. Preferably, ethylene oxide and/or propylene oxide and in particular propylene oxide are used as alkylene oxides.

As suitable H-functional starter substance, compounds with H atoms which are active for alkoxylation are used. Groups with active H atoms which are active for alkoxylation are e.g. —OH, —$NH_2$ (primary amines), —NH— (secondary amines), —SH and —$CO_2H$; —OH and —$NH_2$ are preferred and —OH is particularly preferred. As an H-functional starter substance e.g. one or more compounds selected from the group consisting of water, mono- or polyhydric alcohols, mono- or polyvalent amines, polyvalent thiols, carboxylic acids, amino alcohols, aminocarboxylic acids, thio alcohols, hydroxy esters, polyether polyols, polyester polyols, polyester ether polyols, polyether carbonate polyols, polycarbonate polyols, polyethyleneimines, polyether amines (e.g. so-called Jeffamines® from Huntsman, such as e.g. D-230, D-400, D-2000, T-403, T-3000, T-5000 or corresponding products from BASF, such as e.g. polyether amine D230, D400, D200, T403, T5000), polytetrahydrofurans (e.g. PolyTHF® from BASF, such as e.g. PolyTHF® 250, 650S, 1000, 1000S, 1400, 1800, 2000), polytetrahydrofuranamines (BASF product Polytetrahydrofuranamine 1700), polyether thiols, polyacrylate polyols, castor oil, the mono- or diglyceride of ricinoleic acid, monoglycerides of fatty acids, chemically modified mono-, di- and/or triglycerides of fatty acids, and $C_1$-$C_{24}$ fatty acid alkyl esters containing on average at least 2 OH groups per molecule, are used. The $C_1$-$C_{24}$ fatty acid alkyl esters containing on average at least 2 OH groups per molecule are generally commercial products such as Lupranol Balance® (BASF SE), Merginol® grades (Hobum Oleochemicals GmbH), Sovermol® grades (Cognis Deutschland GmbH & Co. KG) and Soyol®™ grades (USSC Co.).

As monofunctional starter compounds it is possible to use alcohols, amines, thiols and carboxylic acids. As monofunctional alcohols the following can be used: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. As monofunctional amines, the following are suitable: butylamine, tert-butylamine, pentylamine, hexylamine, aniline, aziridine, pyrrolidine, piperidine, morpholine. As monofunctional thiols it is possible to use: ethanethiol, 1-propanethiol, 2-propanethiol, 1-butanethiol, 3-methyl-1-butanethiol, 2-butene-1-thiol, thiophenol. As monofunctional carboxylic acids, the following may be mentioned: formic acid, acetic acid, propionic acid, butyric acid, fatty acids such as stearic acid, palmitic acid, oleic acid, linoleic acid, linolenic acid, benzoic acid and acrylic acid.

Polyhydric alcohols that are suitable as H-functional starter substances are e.g. dihydric alcohols (such as e.g. ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as e.g. 3-methyl-1,5-pentanediol), 1,6-hexanediol; 1,8-octanediol, 1,10-decanediol, 1,12-dodecanediol, bis(hydroxymethyl)cyclohexanes (such as e.g. 1,4-bis-(hydroxymethyl)cyclohexane), triethylene glycol, tetraethylene glycol, polyethylene glycols, dipropylene glycol, tripropylene glycol, polypropylene glycols, dibutylene glycol and polybutylene glycols); trihydric alcohols (such as e.g. trimethylolpropane, glycerol, trishydroxyethyl isocyanurate, castor oil); tetrahydric alcohols (such as e.g. pentaerythritol); polyalcohols (such as e.g. sorbitol, hexitol, sucrose, starch, starch hydrolysates, cellulose, cellulose hydrolysates, hydroxyl-functionalised fats and oils, in particular castor oil), and all modified products of these above-mentioned alcohols with different quantities of ε-caprolactone.

The H-functional starter substances can also be selected from the class of substances of the polyether polyols, in particular those with a molecular weight Mn in the range of 100 to 4000 g/mol. Preferred are polyether polyols built up from repeating ethylene oxide and propylene oxide units, preferably with a proportion of 35 to 100% propylene oxide units, particularly preferably with a proportion of 50 to 100% propylene oxide units. These can be random copolymers, gradient copolymers, alternating or block copolymers of ethylene oxide and propylene oxide. Suitable polyether polyols built up from repeating propylene oxide and/or ethylene oxide units are e.g. Desmophen®, Acclaim®, Arcol®, Baycoll®, Bayfill®, Bayflex®, Baygal®, PET® and polyether polyols from Bayer MaterialScience AG (such as e.g. Desmophen® 3600Z, Desmophen® 1900U, Acclaim® Polyol 2200, Acclaim® Polyol 4000I, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Other suitable homopolyethylene oxides are e.g. the Pluriol® E brands from BASF SE and suitable homopolypropylene oxides are e.g. the Pluriol® P brands from BASF SE, and suitable mixed copolymers of ethylene oxide and propylene oxide are e.g. the Pluronic® PE or Pluriol® RPE brands from BASF SE.

The H-functional starter substances can also be selected from the class of substances of the polyester polyols, in particular those with a molecular weight Mn in the range of 200 to 4500 g/mol. As polyester polyols, at least difunctional polyesters are used. Preferably, polyester polyols consist of alternating acid and alcohol units. As acid components, e.g. succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the above acids and/or anhydrides are used. As alcohol components, e.g. ethanediol, 1,2-propanediol, 1,3-propanediol, 1,4-butanediol, 1,5-pentanediol, neopentyl glycol, 1,6-hexanediol, 1,4-bis-(hydroxymethyl)cyclohexane, diethylene glycol, dipropylene glycol, trimethylolpropane, glycerol, pentaerythritol or mixtures of the above alcohols are used. If divalent or polyvalent polyether polyols are used as the alcohol component, polyester ether polyols are obtained which can also be used as starter substances for the production of polyether carbonate polyols. Preferably, polyether polyols with Mn=150 to 2000 g/mol are used for the production of the polyester ether polyols.

Furthermore, as H-functional starter substances, it is possible to use polycarbonate diols, in particular those with a molecular weight Mn in the range of 150 to 4500 g/mol, preferably 500 to 2500, which are produced e.g. by reacting phosgene, dimethyl carbonate, diethyl carbonate or diphenyl carbonate and difunctional alcohols or polyester polyols or polyether polyols. Examples relating to polycarbonates can be found e.g. in EP-A 1359177. For example, it is possible to use the Desmophen® C grades from Bayer MaterialScience AG, such as e.g. Desmophen® C 1100 or Desmophen® C 2200, as polycarbonate diols.

In another embodiment of the invention, polyether carbonate polyols can be used as H-functional starter substances. In particular, polyether carbonate polyols which are obtainable by the process according to the invention described here are used. These polyether carbonate polyols used as H-functional starter substances are produced in advance in a separate reaction step for this purpose.

The H-functional starter substances generally have a functionality (i.e. number of H atoms which are active for polymerisation per molecule) of 1 to 8, preferably of 2 or 3. The H-functional starter substances are used either individually or as a mixture of at least two H-functional starter substances.

Preferred H-functional starter substances are alcohols of the general formula (II), $$HO-(CH_2)_x-OH \quad (II)$$

wherein x is a number from 1 to 20, preferably an even number from 2 to 20. Examples of alcohols according to formula (II) are ethylene glycol, 1,4-butanediol, 1,6-hexanediol, 1,8-octanediol, 1,10-decanediol and 1,12-dodecanediol. If the alcohols are solid or highly viscous at 20° C., it is advantageous to heat the feed lines to the tubular reactor. Other preferred H-functional starter substances are neopentyl glycol, trimethylolpropane, glycerol and pentaerythritol, reaction products of the alcohols according to formula (II) with ε-caprolactone, e.g. reaction products of trimethylolpropane with ε-caprolactone, reaction products of glycerol with ε-caprolactone and reaction products of pentaerythritol with ε-caprolactone. It is also preferred for water, diethylene glycol, dipropylene glycol, castor oil, sorbitol and polyether polyols built up from repeating polyalkylene oxide units to be used as H-functional starter substances.

Particularly preferably, the H-functional starter substances are one or more compounds selected from the group consisting of ethylene glycol, propylene glycol, 1,3-propanediol, 1,3-butanediol, 1,4-butanediol, 1,5-pentanediol, 2-methylpropane-1,3-diol, neopentyl glycol, 1,6-hexanediol, 1,8-octanediol, diethylene glycol, dipropylene glycol, glycerol, trimethylolpropane, di- and trifunctional polyether polyols, the polyether polyol being built up from a di- or tri-H-functional starter substance and propylene oxide or a di- or tri-H-functional starter substance, propylene oxide and ethylene oxide. The polyether polyols preferably have a molecular weight Mn in the range of 62 to 4500 g/mol and a functionality of 2 to 3 and in particular a molecular weight Mn in the range of 62 to 3000 g/mol and a functionality of 2 to 3.

The production of the polyether carbonate polyols takes place by catalytic addition of carbon dioxide and alkylene oxides to H-functional starter substances. The term "H-functional" within the meaning of the invention is understood as the number of H atoms which are active for alkoxylation per molecule of the starter compound.

DMC catalysts are known in principle from the prior art (see e.g. U.S. Pat. No. 3,404,109, U.S. Pat. No. 3,829,505, U.S. Pat. No. 3,941,849 and U.S. Pat. No. 5,158,922). DMC catalysts, which are described e.g. in U.S. Pat. No. 5,470,813, EP-A 700 949, EP-A 743 093, EP-A 761 708, WO 97/40086, WO 98/16310 and WO 00/47649, have very high activity in the homopolymerisation of epoxides and make it possible to produce polyether polyols with very low catalyst concentrations (25 ppm or less), so that separation of the catalyst from the finished product is generally no longer necessary. The highly active DMC catalysts described in EP-A 700 949 are a typical example which, in addition to a double metal cyanide compound (e.g. zinc hexacyanocobaltate (III)) and an organic complex ligand (e.g. tert.-butanol), also contain a polyether with a number average molecular weight greater than 500 g/mol.

It is also possible to use the alkaline DMC catalysts disclosed in EP application number 10163170.3.

Cyanide-free metal salts suitable for the production of the double metal cyanide compounds preferably have the general formula (III), $$M(X)_n \quad (III)$$

wherein

M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, with M $Zn^{2+}$, $Fe^{2+}$, $Co^{2+}$ or $Ni^{2+}$ being preferred, X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

n is 1 if X=sulfate, carbonate or oxalate and n is 2 if X=halide, hydroxide, cyanate, thiocyanate, isocyanate, isothiocyanate or nitrate, or suitable cyanide-free metal salts have the general formula (IV),

$$M_r(X)_3 \tag{IV}$$

wherein

M selected is from the metal cations $Fe^{3+}$, $Al^{3+}$ and $Cr^{3+}$,

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 if X=sulfate, carbonate or oxalate and r is 1 if X=halide, hydroxide, cyanate, thiocyanate, isocyanate, isothiocyanate, carboxylate or nitrate, or suitable cyanide-free metal salts have the general formula (V),

$$M(X)_s \tag{V}$$

wherein

M is selected from the metal cations $Mo^{4+}$, $V^{4+}$ and $W^{4+}$

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

s is 2 if X=sulfate, carbonate or oxalate and s is 4 if X=halide, hydroxide, cyanate, thiocyanate, isocyanate, isothiocyanate, carboxylate or nitrate, or suitable cyanide-free metal salts have the general formula (VI),

$$M(X)_t \tag{VI}$$

wherein

M is selected from the metal cations $Mo^{6+}$ and $W^{6+}$

X is one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

t is 3 if X=sulfate, carbonate or oxalate and t is 6 if X=halide, hydroxide, cyanate, thiocyanate, isocyanate, isothiocyanate, carboxylate or nitrate.

Examples of suitable cyanide-free metal salts are zinc chloride, zinc bromide, zinc iodide, zinc acetate, zinc acetylacetonate, zinc benzoate, zinc nitrate, iron(II) sulfate, iron (II) bromide, iron(II) chloride, cobalt(II) chloride, cobalt(II) thiocyanate, nickel(II) chloride and nickel(II) nitrate. It is also possible to use mixtures of different metal salts.

Suitable metal cyanide salts for the production of the double metal cyanide compounds preferably have the general formula (VII)

$$(Y)_aM'(CN)_b(A)_c \tag{VII}$$

wherein

M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V), and M' is preferably one or more metal cations from the group consisting of Co(II), Co(III), Fe(II), Fe(III), Cr(III), Ir(III) and Ni(II), Y is selected from one or more metal cations from the group consisting of alkali metal (i.e. $Li^+$, $Na^+$, $K^+$, $Rb^+$, $Cs^+$) and alkaline earth metal (i.e. $Be^{2+}$, $Ca^{2+}$, $Mg^{2+}$, $Sr^{2+}$, $Ba^{2+}$), A is selected from one or more anions from the group consisting of halides (i.e. fluoride, chloride, bromide, iodide), hydroxide, sulfate, carbonate, cyanate, thiocyanate, isocyanate, isothiocyanate, carboxylate, oxalate or nitrate and a, b and c are integers, the values for a, b and c being selected so that there is electroneutrality of the metal cyanide salt; a is preferably 1, 2, 3 or 4; b is preferably 4, 5 or 6; c preferably has the value 0.

Examples of suitable metal cyanide salts are potassium hexacyanocobaltate(III), potassium hexacyanoferrate(II), potassium hexacyanoferrate(III), calcium hexacyanocobaltate(III) and lithium hexacyanocobaltate (III).

Preferred double metal cyanide compounds that are contained in the DMC catalysts according to the invention are compounds of the general formula (VIII)

$$M_x[M'_{x'}(CN)_y]_z \tag{VIII},$$

where M is defined as in formulae (III) to (VI) and

M' as in formula (VII), and x, x', y and z are integers and are selected so that there is electron neutrality of the double metal cyanide compound.

The following are preferred:

x=3, x'=1, y=6 and z=2,

M=Zn(II), Fe(II), Co(II) or Ni(II) and

M'=Co(III), Fe(III), Cr(III) or Ir(III).

Examples of suitable double metal halide compounds a) are zinc hexacyanocobaltate(III), zinc hexacyanoiridate(III), zinc hexacyanoferrate(III) and cobalt(II) hexacyanocobaltate (III). Other examples of suitable double metal cyanide compounds can be taken from e.g. U.S. Pat. No. 5,158,922 (column 8, lines 29-66). Zinc hexacyanocobaltate(III) is particularly preferably used.

The organic complex ligands added during the production of the DMC catalysts are disclosed e.g. in U.S. Pat. No. 5,158,922 (see in particular column 6, lines 9 to 65), U.S. Pat. No. 3,404,109, U.S. Pat. No. 3,829,505, U.S. Pat. No. 3,941, 849, EP-A 700 949, EP-A 761 708, JP 4 145 123, U.S. Pat. No. 5,470,813, EP-A 743 093 and WO-A 97/40086). For example, water-soluble, organic compounds with heteroatoms, such as oxygen, nitrogen, phosphorus or sulfur, which can form complexes with the double metal cyanide compound, are used as organic complex ligands. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble aliphatic alcohols (such as ethanol, isopropanol, n-butanol, isobutanol, sec.-butanol, tert-butanol, 2-methyl-3-buten-2-ol and 2-methyl-3-butyn-2-ol), and compounds which contain both aliphatic or cycloaliphatic ether groups and aliphatic hydroxyl groups (such as e.g. ethylene glycol mono-tert.-butyl ether, diethylene glycol mono-tert.-butyl ether, tripropylene glycol monomethyl ether and 3-methyl-3-oxetanemethanol). Most preferred organic complex ligands are selected from one or more compounds from the group consisting of dimethoxyethane, tert-butanol, 2-methyl-3-buten- 2-ol, 2-methyl-3-butyn-2-ol, ethylene glycol mono-tert.-butyl ether and 3-methyl-3-oxetanemethanol.

Optionally, one or more complex-forming component(s) from the classes of compounds of the poly-ethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinyl-pyrrolidone-co-acrylic acid), polyvinyl methyl ketone, poly(-vinylphenol), poly(acrylic acid-co-styrene), oxazoline polymers, polyalkylene imines, maleic acid and maleic anhydride copolymers, hydroxyethyl cellulose and polyacetals, or the glycidyl ethers, glycosides, carboxylic acid esters of polyhydric alcohols, bile acids or salts, esters or amides thereof, cyclodextrins, phosphorus compounds, $\alpha,\beta$-unsaturated carboxylic acid esters or ionic surface- or interface-active compounds are used in the production of the DMC catalysts according to the invention.

Preferably in the production of the DMC catalysts according to the invention the aqueous solutions of the metal salt (e.g. zinc chloride), used in a stoichiometric excess (at least 50 mole %) based on metal cyanide salt), i.e. at least a molar ratio of cyanide-free metal salt to metal cyanide salt of 2.25 to 1.00), and of the metal cyanide salt (e.g. potassium hexacyanocobaltate) are reacted in the presence of the organic complex ligand (e.g. tert.-butanol) in the first step, so that a suspension forms which contains the double metal cyanide compound (e.g. zinc hexacyanocobaltate), water, excess cyanide-free metal salt and the organic complex ligand. The organic complex ligand can be present here in the aqueous solution of the cyanide-free metal salt and/or of the metal cyanide salt, or it is added directly to the suspension obtained after precipitation of the double metal cyanide compound. It has proved advantageous to mix the aqueous solutions of the cyanide-free metal salt and of the metal cyanide salt and the organic complex ligand while stirring vigorously. The suspension formed in the first step is then optionally treated with a further complex-forming component. The complex-forming component in this case is preferably used in a mixture with water and organic complex ligand. A preferred process for carrying out the first step (i.e. the production of the suspension) takes place using a mixing nozzle, particularly preferably using a jet disperser as described in WO-A 01/39883.

In the second step, the isolation of the solid (i.e. the precursor of the catalyst according to the invention) from the suspension takes place by known techniques, such as centrifugation or filtration.

In a preferred version for the production of the catalyst, the isolated solid is then washed in a third process step with an aqueous solution of the organic complex ligand (e.g. by resuspension and subsequent isolation again by filtration or centrifugation). In this way, for example water-soluble by-products such as potassium chloride can be removed from the catalyst according to the invention. The quantity of the organic complex ligand in the aqueous washing solution is preferably between 40 and 80 wt. %, based on the overall solution.

Optionally in the third step, additional complex-forming component, preferably in the range of between 0.5 and 5 wt. %, based on the overall solution, is added to the aqueous washing solution.

In addition, it is advantageous to wash the isolated solid more than once. This can be achieved e.g. by repeating the first washing process. However, it is preferred to use non-aqueous solutions, e.g. a mixture of organic complex ligand and additional complex-forming component, for further washing processes.

The isolated and optionally washed solid is then dried, optionally after pulverising, at temperatures of in general 20-100° C. and at pressures of in general 0.1 mbar to normal pressure (1013 mbar).

A preferred process for isolating the DMC catalysts according to the invention from the suspension by filtration, filter cake washing and drying is described in WO-A 01/80994.

Preferably, an excess of carbon dioxide based on the calculated quantity of incorporated carbon dioxide in the polyether carbonate polyol is used since, because of the low reactivity of carbon dioxide, an excess of carbon dioxide is advantageous. The quantity of carbon dioxide can be set by means of the reaction pressure or the volume flow. As reaction pressure, the range of 10 to 200 bar, particularly preferably 15 to 180 bar, most particularly preferably 20 to 120 bar has proved advantageous for the copolymerisation for the production of the polyether carbonate polyols. For the process according to the invention it has further been shown that the copolymerisation for the production of the polyether carbonate polyols is advantageously carried out at 80 to 150° C., preferably 90 to 135° C. If temperatures below 80° C. (e.g. 50° C.) are established, the reaction ceases. At temperatures above 150° C., the quantity of undesirable by-products increases markedly. It is also advantageous for the $CO_2$ to be present, as far as possible, in the liquid and/or supercritical state when selecting the pressure and temperature.

EXAMPLES

The weight average and number average of the molecular weight of the resulting polymers was determined by means of gel permeation chromatography (GPC). The procedure followed was that of DIN 55672-1: "Gel permeation chromatography, Part 1-Tetrahydrofuran as Eluent". Polystyrene samples of known molecular weight were used for calibration here.

The OH number was determined on the basis of DIN 53240, but using pyridine instead of THF/dichloromethane as solvent. Titration was carried out with 0.5 molar ethanolic KOH (end point recognition by means of potentiometry). Castor oil with a certified OH number was used as the test substance. The specification of the unit in "mg/g" refers to mg[KOH]/g[polyether carbonate polyol].

The proportion of incorporated $CO_2$ in the resulting polyether carbonate polyol and the ratio of propylene carbonate (cyclic carbonate) to polyether carbonate polyol were determined by $^1$H-NMR (Bruker, DPX 400, 400 MHz; pulse program zg30, waiting time d1: 10 s, 64 scans). The sample was dissolved in deuterated chloroform in each case. The relevant resonances in the $^1$H-NMR (based on TMS=0 ppm) are as follows:

cyclic carbonate (which was formed as a by-product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, 1,8-octanediol optionally incorporated as a starter molecule with a resonance at 1.6 to 1.52 ppm.

The molar proportion of the carbonate incorporated in the polymer in the reaction mixture is calculated according to formula (IX) as follows, the following abbreviations being used:

F(4.5)=area of the resonance at 4.5 ppm for cyclic carbonate (corresponds to an H atom)

F(5.1-4.8)=area of the resonance at 5.1-4.8 ppm for polyether carbonate polyol and an H atom for cyclic carbonate F(2.4)=area of the resonance at 2.4 ppm for free, unreacted PO F(1.2-1.0)=area of the resonance at 1.2-1.0 ppm for polyether polyol F(1.6-1.52)=area of the resonance at 1.6 to 1.52 ppm for 1,8-octanediol (starter)

Taking into account the relative intensities, conversion to mole % was performed according to the following formula (IX) for the polymer bound carbonate ("linear carbonate" LC) in the reaction mixture:

$$LC = \frac{F(5.1-4.8) - F(4.5)}{F(5.1-4.8) + F(2.4) + 0.33 * F(1.2-1.0) + 0.25 * F(1.6-1.52)} * 100 \quad (IX)$$

The proportion by weight (in wt. %) of polymer-bound carbonate (LC') in the reaction mixture was calculated according to formula (X), $$LC' = \frac{[F(5.1-4.8) - F(4.5)] * 102}{N} * 100\% \quad (X)$$

wherein the value for N ("denominator" N) is calculated according to formula (XI):

N=[F(5.1-4.8)−F(4.5)]*102+F(4.5)*102+F(2.4)*58+
    0.33*F(1.2−1.0)*58+0.25*F(1.6−1.52)*146    (XI)

The factor 102 results from the sum of the molecular weights of $CO_2$ (molecular weight 44 g/mol) and propylene oxide (molecular weight 58 g/mol), the factor 58 results from the molecular weight of propylene oxide and the factor 146 results from the molecular weight of the optionally used starter 1,8-octanediol.

The proportion by weight (in wt. %) of cyclic carbonate (CC') in the reaction mixture was calculated according to formula (XII), $$CC' = \frac{F(4.5) * 102}{N} * 100\% \quad (XII)$$

wherein the value for N is calculated according to formula (XI).

In order to calculate the composition based on the polymer proportion (consisting of polyether polyol, which was made up of starter, and polyether carbonate polyol, made up of starter, propylene oxide and carbon dioxide during copolymerisation) from the values of the composition of the reaction mixture, the non-polymer components of the reaction mixture (i.e. cyclic propylene carbonate and any unreacted propylene oxide present) were eliminated from the calculation. The proportion by weight of the carbonate repeating units in the polyether carbonate polyol was converted to a proportion by weight of carbon dioxide by means of the factor F=44/(44+58). The statement of the $CO_2$ content in the polyether carbonate polyol ("incorporated $CO_2$"; see following examples) is standardised to the proportion of the polyether carbonate polyol molecule which does not consist of the starter.

H-functional Starter Substances:

Polyether polyol P: polyether polyol P was produced starting from propylene glycol by alkoxylation using propylene oxide. The polyether polyol P had an OH number of 143 mg KOH/g.

1,8-Octanediol, Aldrich.

Examples 1 to 3

A ground and dried DMC catalyst (double metal cyanide catalyst), produced according to example 6 of WO-A 01/80994, was suspended in polyether polyol P so that a concentration of 0.26 wt. % catalyst in polyether polyol P was achieved.

The schematic test setup for carrying out the tests took place on the basis of FIG. 2: from the agitated feed tank 1, the 0.26 wt. % suspension consisting of polyether polyol P and ground and dried DMC catalyst was transported at 80 g/h by means of a diaphragm pump to a mixer 2 (Cascade Mixer 2 S, 0.6 mm as the smallest gap within the cascade, from Ehrfeld Mikrotechnik BTS GmbH). Propylene oxide from feed tank 3 was transported by means of an HPLC pump (97 g/h) to mixer 2. In mixer 2, mixing took place at a temperature of 20° C., the resulting mixture not yet reacting. This mixed stream together with carbon dioxide (transported from a gas cylinder with dip tube 5 using an HPLC pump at 32 g/h) was fed into the mixer 4 (Cascade Mixer 2 S, 0.6 mm as smallest gap within the cascade, from Ehrfeld Mikrotechnik BTS GmbH), where the components were mixed at a temperature of 20° C. Here again, no reaction yet took place. The reaction mixture was passed from 4 into the tubular reactor 6. The tubular reactor had an external diameter of 2.2 mm and was controlled at the reaction temperature given in Table 1 below. The volume of the tubular reactor was 45 $cm^3$. The average residence time of the components in the tubular reactor was 11 minutes in each case. The to maintain a constant pressure of 110 bar in the tubular reactor was adjusted by means of the pressure retention valve 7. The resulting product (substantially polyether carbonate polyol) was collected in the tank 8.

TABLE 1

| | Example | | |
|---|---|---|---|
| | 1 | 2 | 3 |
| Reaction temperature | 110 | 120 | 130 |
| PO conversion [%] | >99% | >99% | >99% |
| Incorporated $CO_2$ [wt. %] | 22.9 | 14.9 | 7.9 |
| Cyclic/linear carbonate ratio | 0.02 | 0.03 | 0.04 |
| Weight average molecular weight [g/mol] | 2264 | 2245 | 2135 |
| Number average molecular weight [g/mol] | 2785 | 2744 | 2620 |
| Polydispersity | 1.23 | 1.22 | 1.23 |

General Information Relating to Comparative Examples 4 and 5 in a Stirred Reactor:

It was tested whether copolymerisation of propylene oxide with $CO_2$ starts in a stirred reactor with direct continuous metering of propylene oxide and $CO_2$ (i.e. without an upstream step for activation of the DMC catalyst). In the case of activation of the DMC catalyst, the copolymerisation would start instantaneously, which would become apparent through a slight temperature increase of the reaction mixture and/or by a consumption of $CO_2$ (measured with a CORI-FLOW® mass flow meter from Bronkhorst® High-Tech, Ruurlo, Netherlands).

Comparative Example 4

Test for the Production of a Polyether Carbonate Polyol in a Stirred Reactor 141 mg of dried and ground DMC catalyst (double metal cyanide catalyst), produced according to example 6 of WO-A 01/80994, were initially charged in a 1-liter pressure reactor (stirred reactor) with a gas metering device together with 51 g of dried 1,8-octanediol. The reactor was heated to 130° C. and rendered inert by repeatedly pressurising with nitrogen to approx. 5 bar with subsequent release of pressure to approx. 1 bar. This procedure was performed three times. The stirred reactor was then pressurised with 50 bar $CO_2$ at 130° C. A quantity of 25 g of propylene oxide (PO) was then metered into the stirred reactor, and it was tested whether activation of the DMC catalyst takes place and copolymerisation starts. Over a period of two hours, no temperature increase of the reaction mixture was observed and no $CO_2$ was consumed. No copolymerisation took place.

Comparative Example 5

Test for the Production of a Polyether Carbonate Polyol in a Stirred Reactor 141 mg of dried and ground DMC catalyst (double metal cyanide catalyst), produced according to example 6 of WO-A 01/80994, were initially charged in a 1-liter pressure reactor (stirred reactor) with a gas metering device together with 274.38 g of polyether polyol P. The reactor was heated to 130° C. and rendered inert by repeatedly pressurising with nitrogen to approx. 5 bar with subsequent release of pressure to approx. 1 bar. This procedure was performed three times. The stirred reactor was then pressurised with 50 bar $CO_2$ at 105° C. The continuous metering of propylene oxide (PO) at 1.8 g/min into the stirred reactor was then commenced and it was tested whether copolymerisation starts. No consumption of $CO_2$ was initially observed, which indicates an inactive state of the catalyst. After a metering period of 53 minutes and a metered quantity of PO of approx. 96 g, no $CO_2$ consumption and no temperature increase of the reaction mixture was observed. No copolymerisation took place.

Examples 1 to 3 according to the invention prove that it is possible to omit the use of an activation step for the DMC catalyst if the copolymerisation is performed in a tubular reactor. If, on the other hand, the copolymerisation is performed in a stirred reactor, no activation of the DMC catalyst takes place within a reasonable period of time (comparative examples 4 and 5).

The invention claimed is:

1. A process for the production of polyether carbonate polyols comprising adding one or more alkylene oxides and carbon dioxide to one or more H-functional starter substances in the presence of at least one DMC catalyst, wherein the adding step comprises
    (i) suspending the DMC catalyst in one or more H-functional starter substances to form a suspension,
    (ii) bringing the suspension from (i) into contact with one or more alkylene oxides and with 10 to 200 bar carbon dioxide to form a mixture, and
    (iii) reacting the mixture resulting from (ii) in a tubular reactor at a temperature of 80 to 150° C.

2. The process according to claim 1, wherein in step (iii) the reaction pressure is 10 to 200 bar.

3. The process according to claim 1, wherein in step (ii)
    (ii-1) the suspension from (i) is firstly brought into contact in a first mixer with one or more alkylene oxides and is then brought into contact in a second mixer with 10 to 200 bar carbon dioxide, or
    (ii-2) the suspension from (i) is firstly brought into contact in a first mixer with 10 to 200 bar carbon dioxide and is then brought into contact in a second mixer with one or more alkylene oxides.

4. The process according to claim 1, wherein step (iii) is carried out at a reaction pressure of 15 to 180 bar.

5. The process according to claim 1, wherein step (iii) is carried out at a temperature of 90 to 135° C. and a reaction pressure of 20 to 180 bar.

6. The process according to claim 1, wherein the tubular reactor is constructed from a continuous piece of tube.

7. The process according to claim 1, wherein the internal diameter of the tubular reactor is from 1.1 mm to 500 mm.

8. The process according to claim 1, wherein the tubular reactor is constructed from at least two tubes joined together.

9. The process according to claim 1, wherein the tubular reactor is constructed from at least two tubes joined together, and wherein the tubular reactor over the first 20 to 60% of its length has an internal diameter of from 1.1 mm to <100 mm, and over the second 80 to 40% of its length has an internal diameter of from 100 mm to 500 mm.

10. The process according to claim 1, wherein the tubular reactor is free from several layers arranged in parallel one on top of the other so that each layer has a plurality of channels arranged parallel to one another which form a continuous flow path from one side of the plate to the opposite side thereof.

11. The process according to claim 1, wherein the tubular reactor is free from several layers arranged in parallel one on top of the other, which are microstructured so that each layer has a plurality of channels arranged parallel to one another which form a continuous flow path from one side of the plate to the opposite side thereof.

12. The process according to claim 1, wherein the one or more H-functional starter substance is selected from the group consisting of polyether polyol, polyester polyol, polyether carbonate polyol, water, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, 3-methyl-1,5-pentanediol, 1,6-hexanediol; 1,8-octanediol, 1,10-decanediol, 1,12-dodecanediol, 1,4-bis(hydroxymethyl)cyclohexane, triethylene glycol, tetraethylene glycol, dipropylene glycol, tripropylene glycol, dibutylene glycol trimethylolpropane, glycerol, tris(hydroxyethyl) isocyanurate, castor oil, pentaerythritol, sorbitol, hexitol, sucrose, starch, starch hydrolysate, cellulose, cellulose hydrolysate, hydroxyl-functionalised fats and hydroxyl-functionalised oils.

13. The process according to claim 1, wherein the tubular reactor has a ratio of tube length L to tube diameter dR of L/dR>50.

* * * * *